(12) United States Patent
Nielsen

(10) Patent No.: US 7,931,139 B2
(45) Date of Patent: Apr. 26, 2011

(54) PASTEURIZER WITH CONVEYOR BELT

(75) Inventor: Jorgen T. Nielsen, Alsgarde (DK)

(73) Assignee: Sander Hansen A/S, Brondby (DK)

( * ) Notice: Subject to any disclaimer, the term of this patent is extended or adjusted under 35 U.S.C. 154(b) by 971 days.

(21) Appl. No.: 11/587,772

(22) PCT Filed: Feb. 17, 2005

(86) PCT No.: PCT/EP2005/001634
§ 371 (c)(1),
(2), (4) Date: May 29, 2007

(87) PCT Pub. No.: WO2005/108248
PCT Pub. Date: Nov. 17, 2005

(65) Prior Publication Data
US 2007/0221482 A1   Sep. 27, 2007

(30) Foreign Application Priority Data

Apr. 30, 2004   (DE) .................. 10 2004 021 262

(51) Int. Cl.
*B65G 17/40* (2006.01)
(52) U.S. Cl. ......... 198/851; 198/850; 198/852; 198/853
(58) Field of Classification Search .................. 198/850, 198/851, 852, 690.2, 688, 698
See application file for complete search history.

(56) References Cited

U.S. PATENT DOCUMENTS

| | | | | | |
|---|---|---|---|---|---|
| 874,915 | A | * | 12/1907 | Perry | 198/500 |
| 2,792,928 | A | * | 5/1957 | Holz | 198/853 |
| 3,602,364 | A | * | 8/1971 | Maglio et al. | 198/689.1 |
| 3,857,478 | A | * | 12/1974 | Meeusen | 198/690.2 |
| 4,084,687 | A | * | 4/1978 | Lapeyre | 198/844.2 |
| 4,167,999 | A | * | 9/1979 | Haggerty | 198/851 |
| 4,832,183 | A | * | 5/1989 | Lapeyre | 198/699 |
| 4,925,013 | A | * | 5/1990 | Lapeyre | 198/698 |
| 4,989,723 | A | * | 2/1991 | Bode et al. | 198/635 |
| 5,000,311 | A | * | 3/1991 | Abbestam et al. | 198/867.14 |
| 5,004,097 | A | * | 4/1991 | Roinestad et al. | 198/867.01 |
| 5,125,504 | A | * | 6/1992 | Corlett et al. | 198/850 |

(Continued)

FOREIGN PATENT DOCUMENTS

| DE | 22 43 154 | 3/1973 |
|---|---|---|
| DE | 2243 154 | 3/1973 |
| DE | 73 15 664 U | 9/1973 |

(Continued)

OTHER PUBLICATIONS

Office Action for CN 200580019051.8 dated Jun. 26, 2009.

*Primary Examiner* — Douglas A Hess
(74) *Attorney, Agent, or Firm* — Marshall, Gerstein & Borun LLP

(57) ABSTRACT

A pasteurizer with a conveyor belt for transporting the goods to be pasteurized, the conveyor belt having an endless structure 39 comprising several metal bodies 13, 22, and several plastic pieces 30 forming the conveyor surface 38 being coupled to the structure 39. Also, a conveyor belt, in particular for a pasteurizer, comprising an endless structure having several metal bodies, with several plastic pieces 30 forming the conveyor surface 38 being coupled to the structure 39. Also, a conveyor belt, in particular for a pasteurizer, the conveyor belt 3 comprising several identical modules 29 in the longitudinal as well as in the transverse direction, each module 29 having several identical bodies in the longitudinal as well as in the transverse direction.

21 Claims, 9 Drawing Sheets

U.S. PATENT DOCUMENTS

Figure 1:
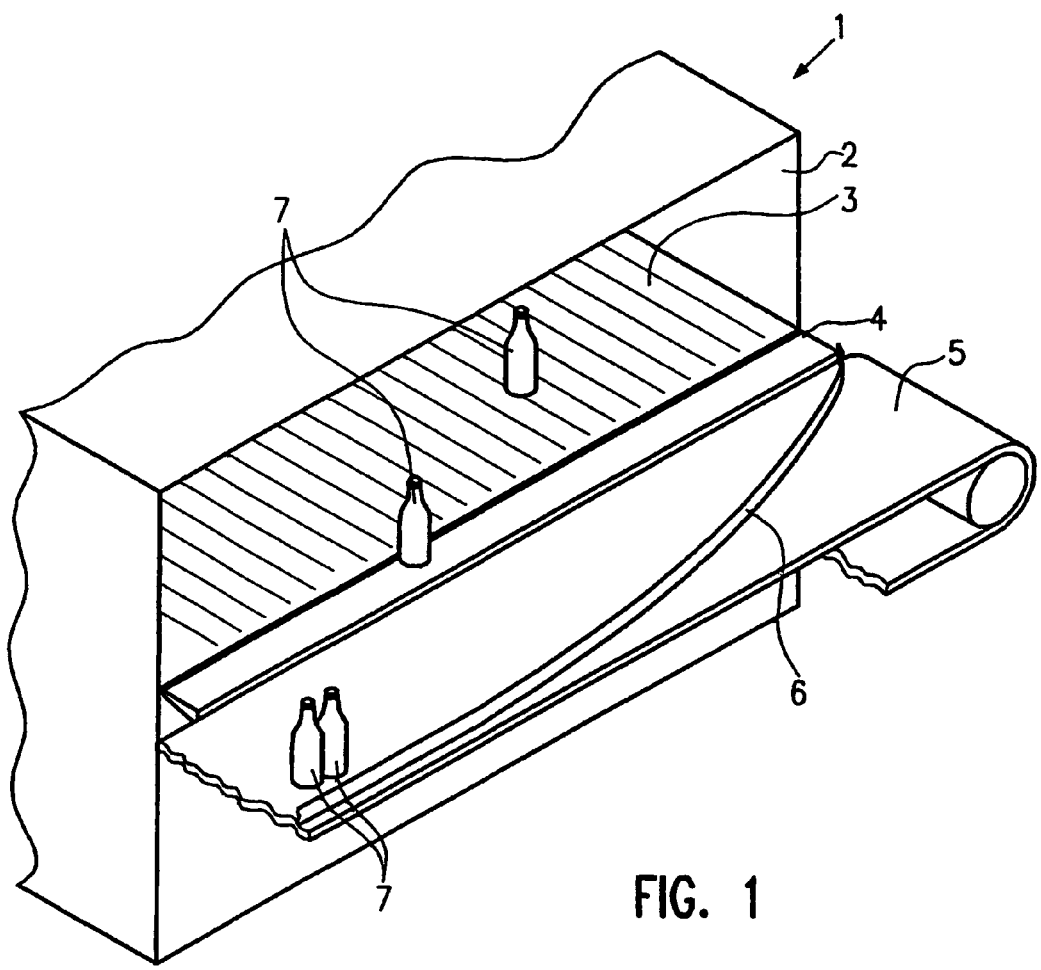

| | | | |
|---|---|---|---|
| 5,361,893 A * | 11/1994 | Lapeyre et al. | 198/853 |
| 5,377,819 A * | 1/1995 | Horton et al. | 198/853 |
| 5,497,874 A * | 3/1996 | Layne | 198/698 |
| 5,507,383 A * | 4/1996 | Lapyere et al. | 198/853 |
| 5,927,268 A * | 7/1999 | Chiang et al. | 126/299 D |
| 6,098,792 A * | 8/2000 | Olsson | 198/850 |
| 6,811,021 B1 * | 11/2004 | Corley | 198/690.2 |
| 6,827,204 B2 * | 12/2004 | Cribiu' | 198/844.1 |
| 6,926,134 B2 * | 8/2005 | Verdigets et al. | 198/867.15 |
| 6,948,613 B2 * | 9/2005 | Guldenfels et al. | 198/853 |
| 6,966,435 B2 * | 11/2005 | Weiser et al. | 198/851 |
| 6,997,309 B2 * | 2/2006 | Stebnicki et al. | 198/850 |
| 7,111,725 B2 * | 9/2006 | Marshall et al. | 198/850 |
| 7,222,730 B2 * | 5/2007 | Garbagnati et al. | 198/853 |
| 7,267,221 B2 * | 9/2007 | Hall | 198/853 |
| 7,331,448 B2 * | 2/2008 | Stebnicki et al. | 198/853 |
| 7,494,006 B2 * | 2/2009 | Knott et al. | 198/850 |
| 7,658,277 B2 * | 2/2010 | Meulenkamp | 198/850 |

FOREIGN PATENT DOCUMENTS

| | | |
|---|---|---|
| DE | 25 33 491 A1 | 2/1977 |
| DE | 28 08 052 A1 | 11/1978 |
| DE | 29 09 893 A1 | 9/1980 |
| DE | 37 12 303 A1 | 10/1987 |
| DE | 88 11 682 U1 | 10/1988 |
| DE | 90 07 192 U1 | 10/1990 |
| DE | 39 39 083 A1 | 5/1991 |
| DE | 40 30 693 A1 | 4/1992 |
| DE | 42 36 461 A1 | 5/1993 |
| EP | 09 16 598 A1 | 5/1999 |
| EP | 0916598 A1 | 5/1999 |
| EP | 09 53 522 A1 | 11/1999 |
| EP | 0953522 A1 | 11/1999 |
| EP | 09 74 537 A2 | 1/2000 |
| EP | 0974537 A2 | 1/2000 |
| FR | 520422 | 6/1921 |
| JP | 1247827 | 3/2000 |
| JP | 1343616 | 4/2002 |

* cited by examiner

PASTEURIZER WITH CONVEYOR BELT

CROSS-REFERENCE TO RELATED APPLICATION

This is the U.S. national stage under 35 U.S.C. §371, of international application no. PCT/EP2005/001634, having an international filing date of Feb. 17, 2005, and claims priority to German application no. 10 2004 021 262.7 filed on Apr. 30, 2004.

FIELD OF THE DISCLOSURE

The disclosure relates to a pasteurizer with a conveyor belt as well as to a conveyor belt for a pasteurizer.

BACKGROUND OF THE DISCLOSURE

A pasteurizer with a conveyor belt is known from EP 1 348 345.

A transport conveyor for transporting the products to be pasteurized through the pasteurizer is provided. Such transport conveyors have a width of up to several meters, such as 5 or 6 m. On this conveyor, tins, beverage cans, glass bottles or the like are slowly transported through the different zones of the pasteurizer, so that the products are pasteurized in the process.

From practice, conveyor belts of plastic elements or steel elements are known for this purpose. The elements are joined such that they form a conveyor belt with a conveyor surface.

The conveyor belts of steel have the disadvantage that they are very heavy and relatively expensive to manufacture.

The conveyor belts of plastic elements have the disadvantage of a high wear and that the plastic elements extremely age due to the frequent heating and cooling down as well as due to the contact with the water and the substances solved therein, which shortens service life compared to steel conveyors.

From EP 0 953 522, for example, a conveyor mat and a conveyor device are known. In this conveyor, individual plastic elements are joined to form a conveyor mat.

The disadvantages of this plastic conveyor are the same as with the conveyor belts of plastic elements known from practice.

SUMMARY OF THE DISCLOSURE

It is the object of the present disclosure to improve a pasteurizer with a conveyor belt as well as a conveyor belt.

The conveyor belt has an endless structure composed of several metal bodies. This structure of metal bodies is appropriate for absorbing the tensile forces occurring during transport, is dimensionally stable, non-ageing and shows little wear.

Furthermore, the structure is insensitive with respect to thermal fluctuations compared to plastics.

Plastic pieces forming the conveyor surface are coupled to this structure.

The plastic pieces are relatively cheap to manufacture and can also be cheaply manufactured in complex shapes, for example by injection moulding methods.

Relatively large surfaces which then compose the conveyor surface can be formed with the plastic pieces. Such a conveyor is thus non-ageing, shows little wear and is at the same time inexpensive.

In a preferred embodiment, several bodies are provided transversely to the conveying direction as well as in the conveying direction. Due to several bodies in the conveying direction, the movability of the conveyor belt is ensured, whereas due to several members transverse to the conveying direction, manufacture and repair are facilitated.

Advantageously, the plastic pieces are fixed to the structure individually or only in a low number (for example, 5 to 15) of plastic pieces. This has the advantage that for exchanging a plastic piece, only this one itself or only a few of them have to be uncoupled from the structure.

Advantageously, one plastic piece is provided per metal body. This is advantageous as each body per se is rigid and thus appropriate for receiving a plastic piece that is also rigid.

However, per body several plastic pieces or per plastic piece several bodies can also be provided.

The plastic pieces preferably have ribs extending into the conveying direction at the conveyor surface. Such ribs facilitate the delivery of goods to be pasteurized from the conveyor belt to a removing conveyor as the ribs can engage with a rack arranged at the end of the conveyor path.

The structure advantageously comprises identical modules, each module comprising several identical bodies. The bodies of one module are fixed to one another so as to form a unit.

The combination of bodies in pre-assembled units in the form of modules on the one hand permits easier exchange of, for example, only one module in case of a repair and furthermore permits the pre-assembly of units that are easy to handle and to transport.

At their respective sides, the modules preferably have plug-in connections by which they can be connected to other modules.

A preferred embodiment of the metal bodies is a U-shaped one, as this on the one hand offers the possibility of performing the connection with the plastic piece at several points, and furthermore quasi a rectangular grid can be composed of these U-shaped parts.

The bodies of a module are connected with connector rods extending transversely to the conveying direction. With these connector rods, the individual bodies can be easily connected and disconnected again. Furthermore, the connector rods offer the simple possibility of also arranging rollers by which the conveyor belt can roll on a support structure.

The plastic pieces are advantageously connected to the metal bodies on the one hand by projections that can engage with openings of the metal body and/or by fixing rods.

The fixing rods and/or the connector rods are advantageously as long as one module is wide, seen in the conveying direction. This has the advantage that, for exchanging the rods or the pieces connected thereby, not all the rods across the whole width of the conveyor belt have to be removed, but only those of the corresponding module.

BRIEF DESCRIPTION OF THE DISCLOSURE

Figure 2:
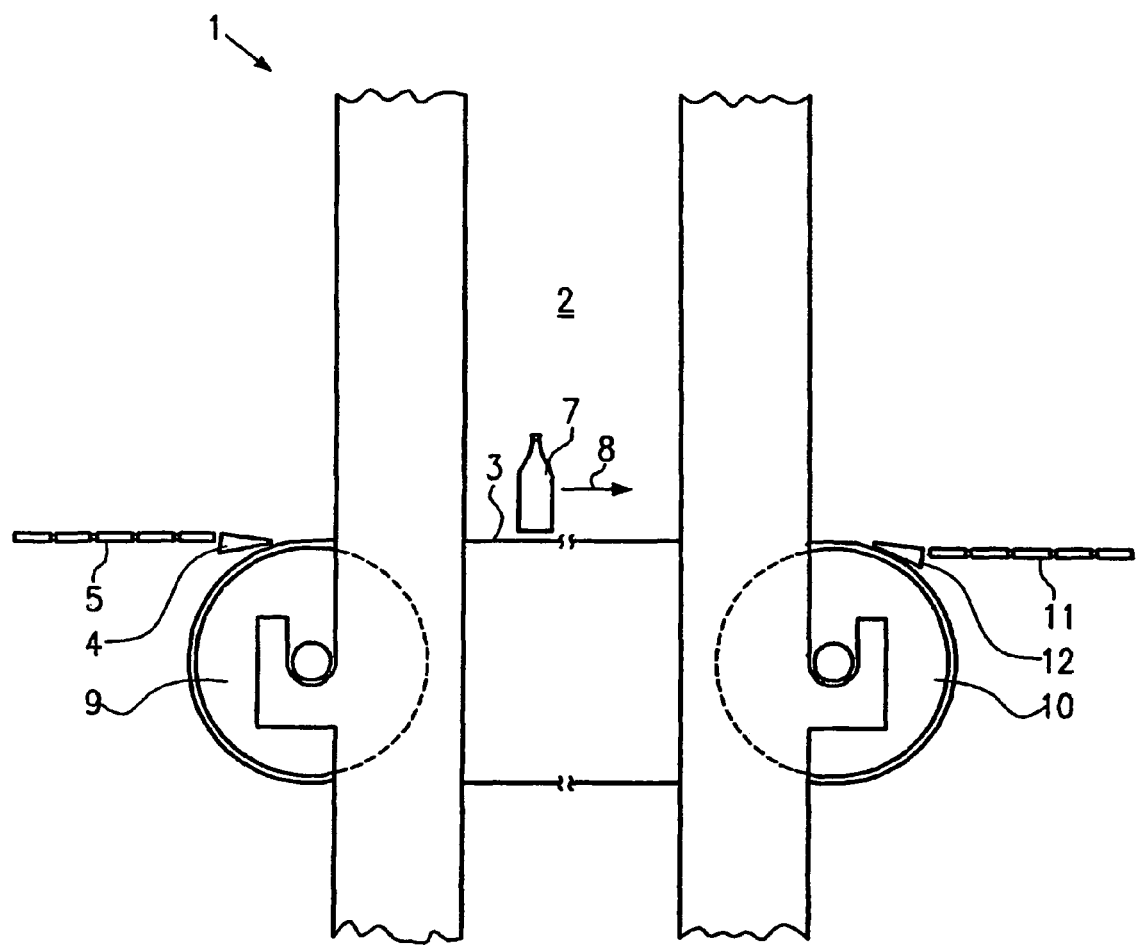
Figure 3:
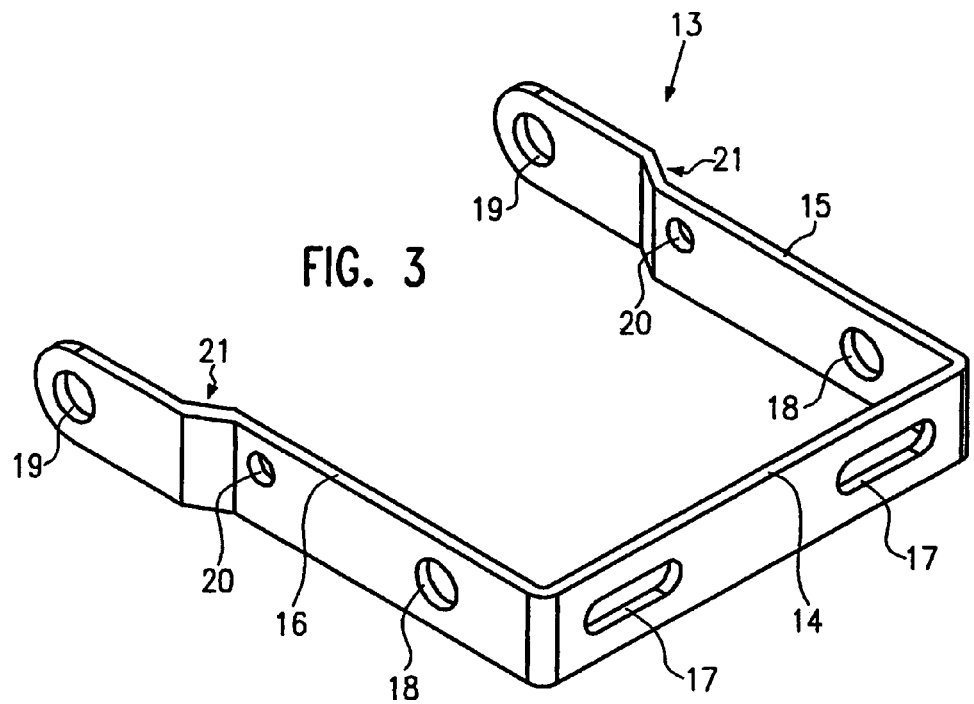
Figure 4:
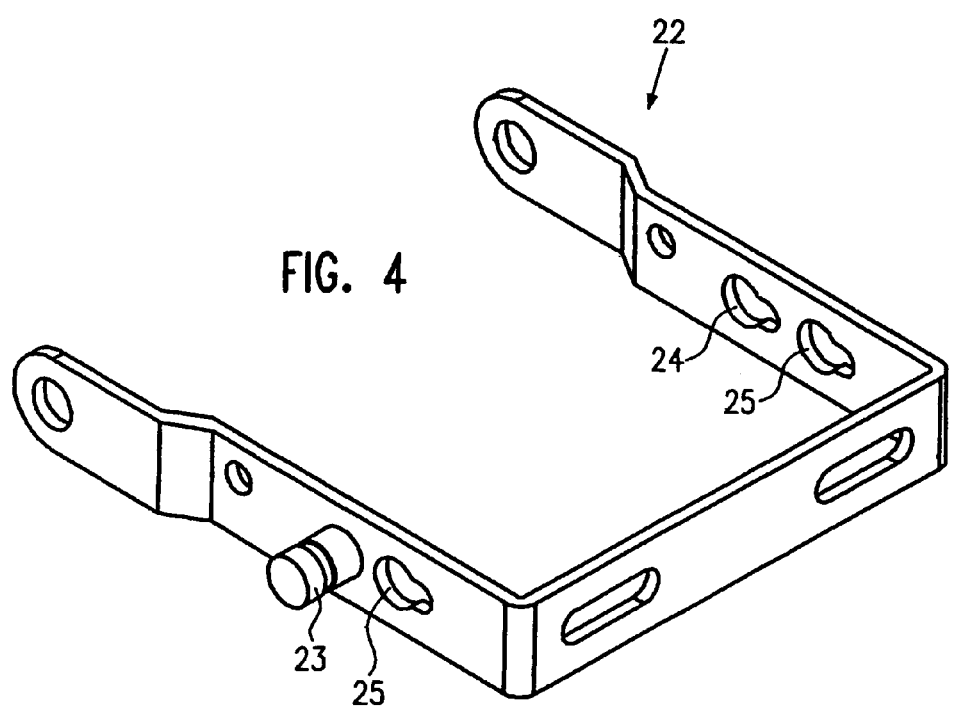
Figure 5:
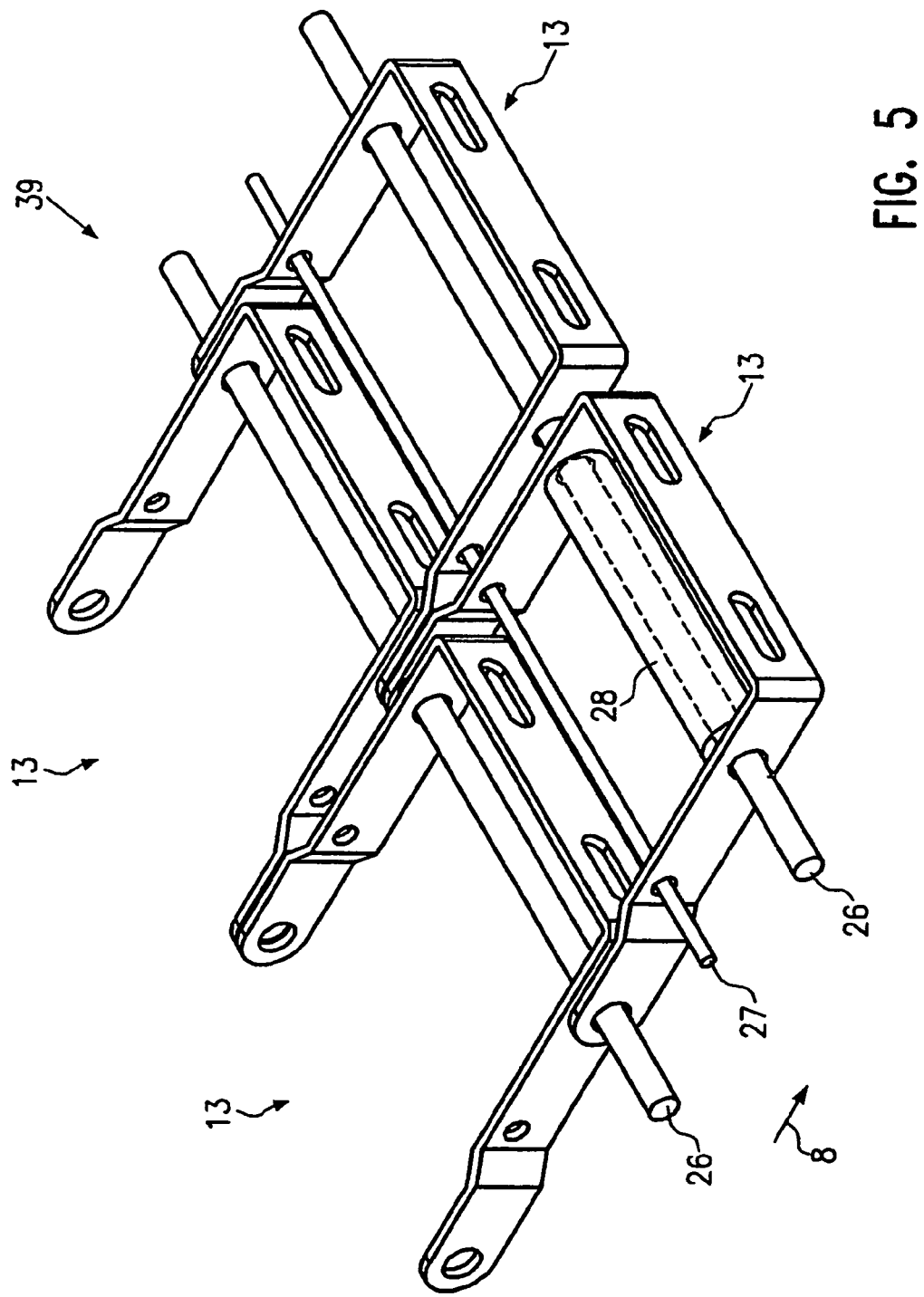
Figure 6:
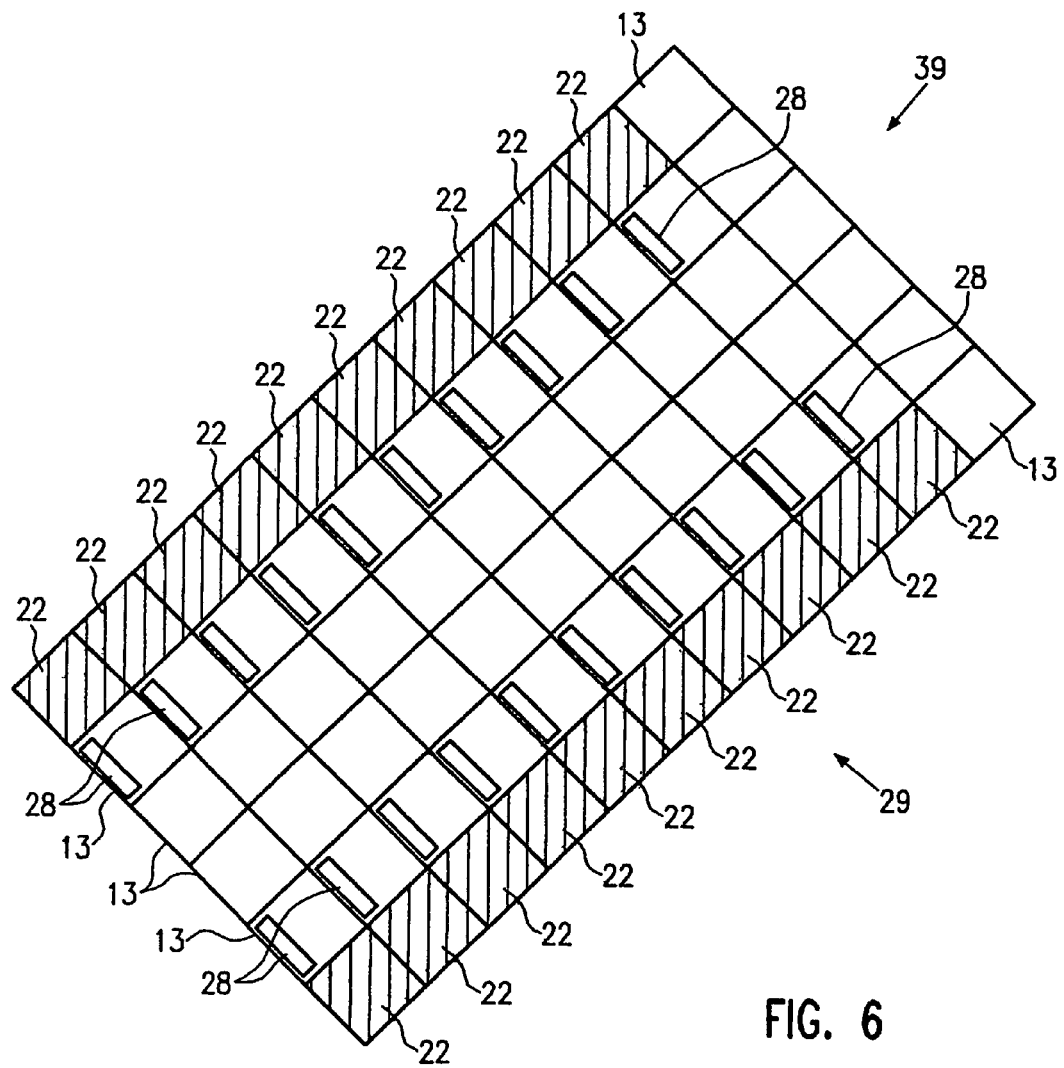
Figure 7:
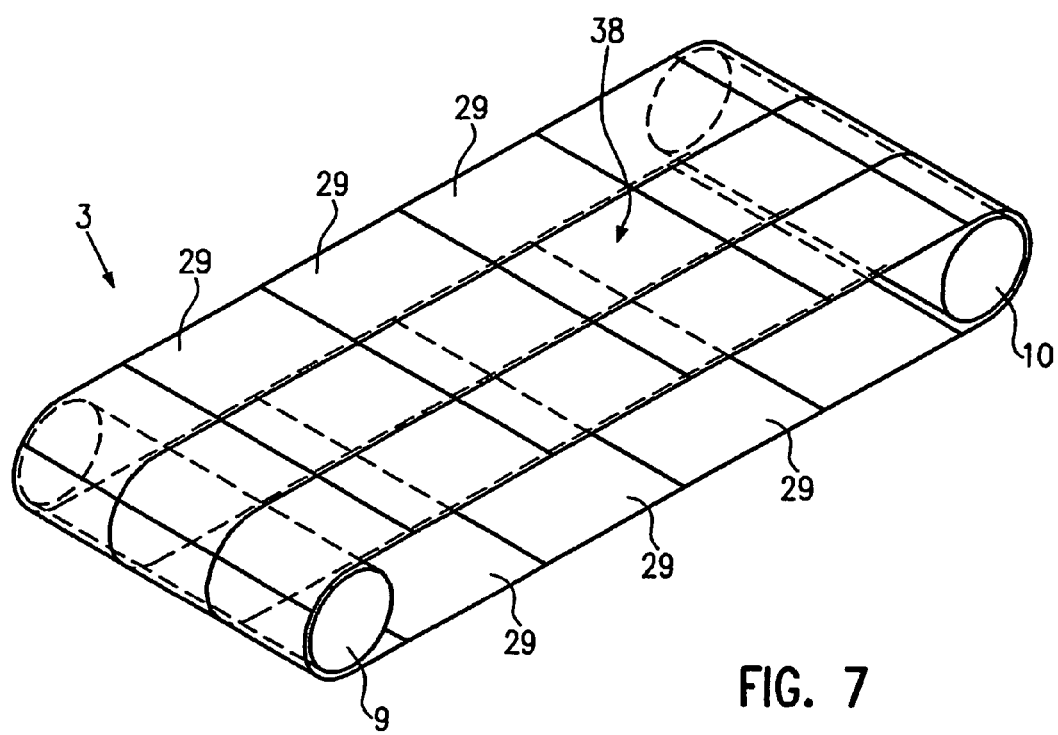
Figure 8:
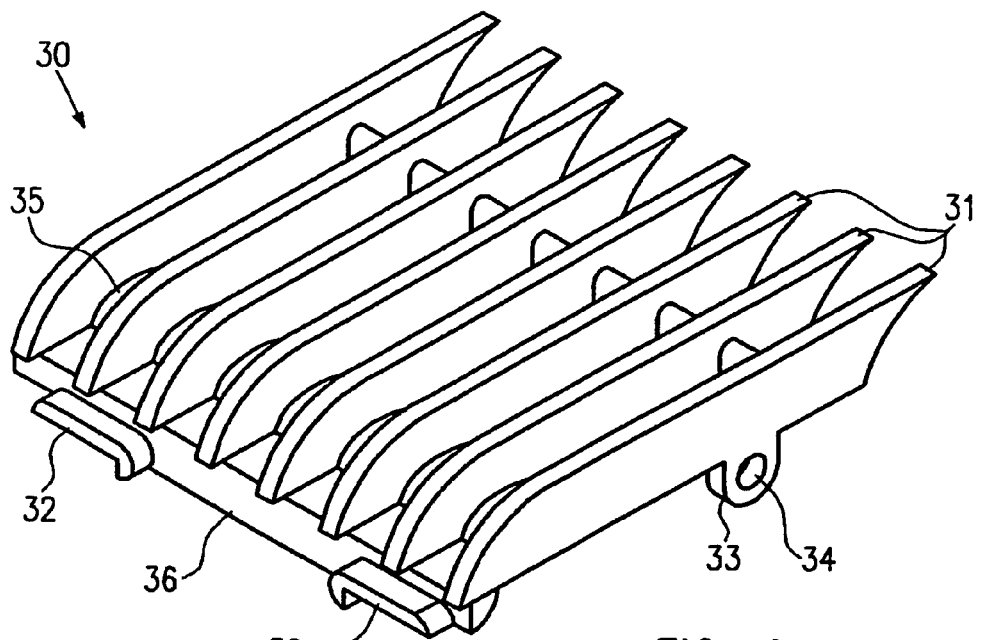
Figure 9:
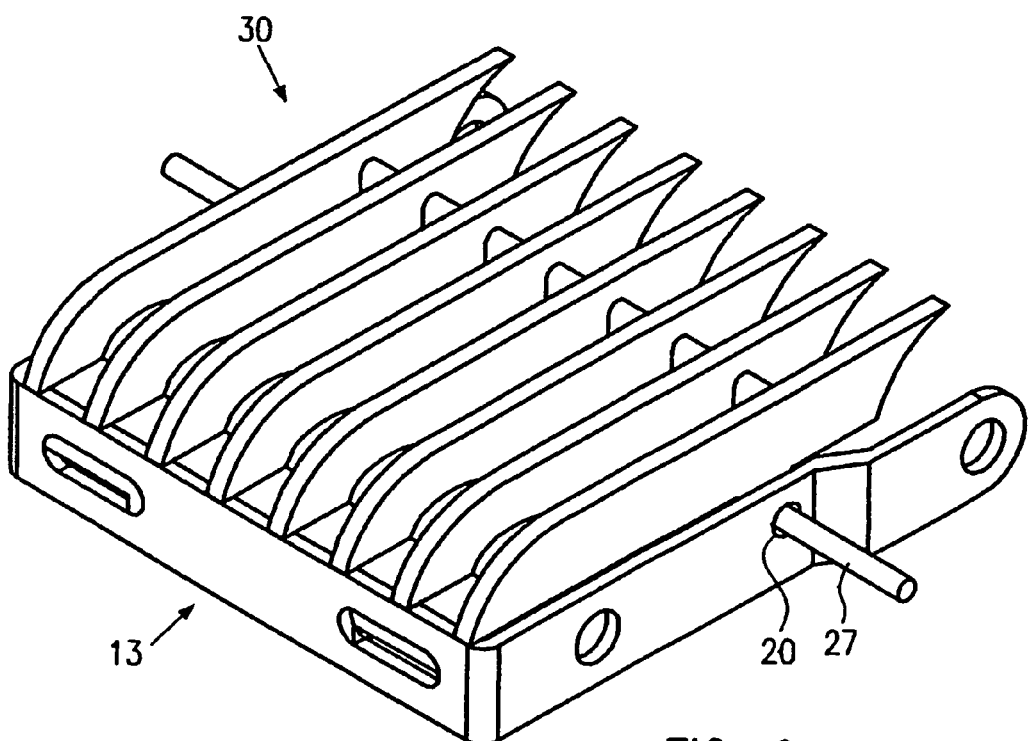
Figure 10:
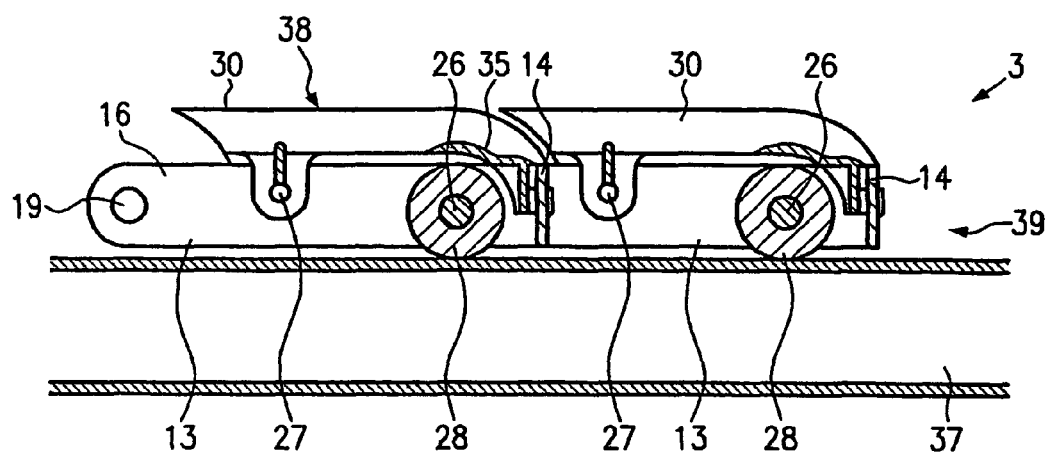
Figure 11:
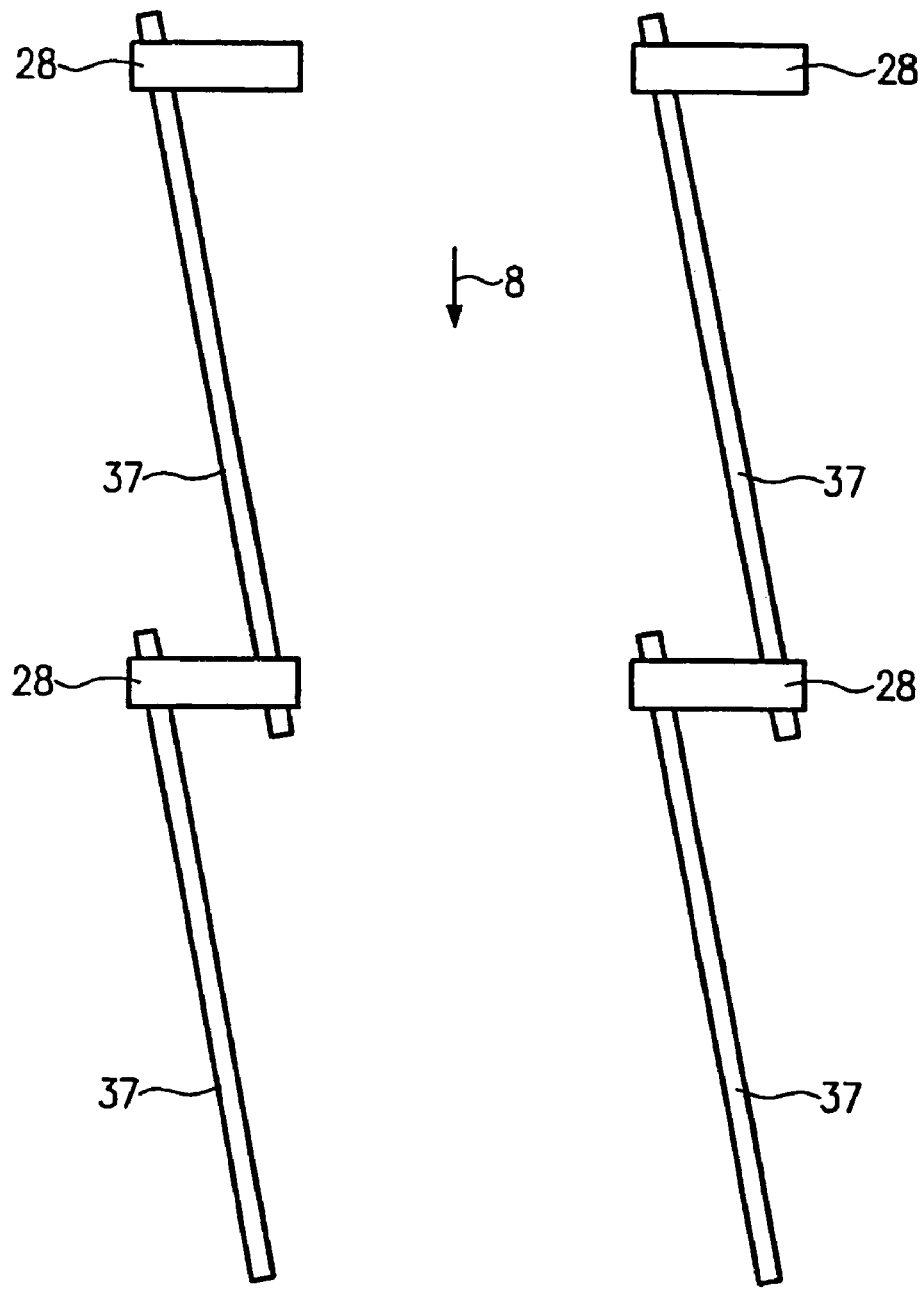

Advantageous embodiments of the disclosure are represented in the drawings, wherein:

FIG. 1 shows a three-dimensional, schematic representation of the entry area of a pasteurizer, FIG. 2 shows a schematic sectional drawing of a pasteurizer, FIG. 3 shows a three-dimensional, schematic representation of a metal body, FIG. 4 shows a three-dimensional, schematic representation of a metal end body, FIG. 5 shows a three-dimensional, schematic representation of several composed metal bodies, FIG. 6 shows a three-dimensional, schematic representation of a module, FIG. 7 shows a three-dimensional, schematic representation of a conveyor belt, FIG. 8 shows a three-dimensional, schematic representation of a plastic piece, FIG. 9 shows a three-dimensional, schematic representation of a plastic piece in connection with a metal body, FIG. 10 shows a schematic sectional drawing of the conveyor belt and a support, FIG. 11 shows a schematic representation of supports and track rollers.

DETAILED DESCRIPTION OF THE DISCLOSURE

FIG. 1 shows the entry area of a pasteurizer 1. The pasteurizer comprises a tunnel 2 that can be several 10 meters long. The products to be pasteurized, such as bottles, tins, beverage cans or the like, are passed through this tunnel 2.

In the Figures, by way of example bottles 7 are depicted. The bottles 7 are transported through the tunnel 2 on a conveyor belt 3.

A feeder belt 5 leads to the entry area of the pasteurizer 1. By means of a railing 6, the bottles 7 are distributed across the entry area of the pasteurizer 1.

The conveyor speed of the feeder belt 5 is normally clearly higher than that of the conveyor belt 3 of the main conveyor. The main conveyor operates comparably slowly in order to ensure sufficient pasteurization time in the pasteurizer 1.

FIG. 2 shows a schematic section through a pasteurizer 1. In the left, the entry area with the feeder belt 5 is depicted, while in the right the output area with a removing belt 11 is depicted. The pasteurizer 1 comprises the conveyor belt 3 that is guided over rolls 9, 10. With the conveyor belt 3, the bottles 7 are transported from the entry to the exit in direction of arrow 8 (conveying direction). Between the feeder belt 5 and the conveyor belt 3, a push-over surface 4 is provided in order to facilitate or permit the delivery of the bottles 7. The push-over surface 4 can be inclined towards the conveyor belt 3. Likewise, a push-over surface 12 is arranged between the conveyor belt 3 and the removing belt 11. The conveyor belt 3 can be provided with ribs that are passed through corresponding slots (not shown) of the push-over surfaces 4 and/or 12 in order to facilitate the pushing over. The push-over surfaces 4, 12 are then designed as a kind of rack.

FIG. 3 shows a metal body 13 by which the endless structure of the conveyor belt 3 is formed.

The body 13 has a U-shape with lateral legs 15, 16 and a connector piece 14.

In the lateral legs 15 and 16, holes (e. g. borings) 18, 19 are provided which serve for connecting several successive bodies 13 by means of rods.

Furthermore, holes 20 (e.g. borings) are provided which serve for fixing the plastic piece to the body 13. The recesses 17 arranged in the connector piece 14 also serve this purpose.

In one area 21, the lateral legs 15, 16 are bent. This makes it possible to place another metal body with its connector piece between the ends of the lateral legs 15, 16, so that the borings 18 of such a piece are aligned with the borings 19 of the piece shown in FIG. 3 in order to thus pass a rod through the borings and thus connect the pieces.

In FIG. 4, a second metal body is shown which will be designated as end body below. The end body 22 additionally has a pin 23 with a groove at one lateral leg as well as a keyhole-shaped opening 24 at the opposite lateral leg. The pin 23 can be inserted through the large opening portion of the keyhole opening 24 and then be shifted through a groove in the pin 23 into the narrow portion of the keyhole opening 24. Instead of the boring 18 (see FIG. 3), here, too, keyhole-shaped openings 25 are provided the function of which will be illustrated below.

FIG. 5 shows how a two-dimensional structure 39 can be formed from the U-shaped bodies 13.

Connector rods 26 pass through the openings 19 at the ends of the lateral legs 15, 16 of a body 13, between the ends of the legs 15, 16, a further body 13 being inserted, so that the connector rod 26 passes through the front borings 18 of the body 13 arranged behind.

In the direction along the connector rods 26, several rows of interconnected bodies 13 are arranged.

A roller 28 is put on the lower connector rod 26 in FIG. 5 in the left. The roller 28 is dimensioned such that it projects over the lower edge of the metal body 13 (non-depicted).

A connector rod 27 is passed through the openings 20 arranged one next to the other, the function of which will be illustrated below.

In FIG. 5, only the connection of normal metal bodies 13 is shown, not, however, that of end bodies 22.

In order to fix end bodies 22 (see FIG. 4), the connector rod 26 has two grooves. The connector rod 26 can be passed through the large openings of the keyhole openings 25 and be connected to the end body 22 by shifting the end body 22 such that the grooves of the connector rod 26 engage with the narrow portions of the keyhole openings 25 or are locked therein. This excludes a shifting of the end body 22 along the connector rod 26.

If an end body 22 is arranged at each of the ends of the connector rods 26 in this manner, these end bodies 22 hold the normal bodies 13 arranged in-between, such that these cannot slip from the rods 26.

In this manner, it is possible to assemble modules 29, as they are shown in FIG. 6. The module 29 in FIG. 6 consists of six rows and eleven lines of metal bodies. Some of them are end bodies 22, and some are normal bodies 13.

The end bodies 22 are arranged at the sides and represented by a shading. For a better overview, the connector rods 26 are not shown in FIG. 6.

The end bodies 22, which face outwards with a keyhole opening 24, have no pin 23 as this would collide with the adjacent body 13. Alternatively, if there does exist a pin, this body 13 can also comprise an appropriate opening for loosely or firmly receiving the pin 23 in order to avoid the collision. These openings can be, for example, the openings 18 (s. FIG. 3).

In the rearmost row in FIG. 6, no end bodies 22 but normal bodies 13 are provided at the sides. However, end bodies 22 could also be provided.

The connector rods 26 extend across the width of one module 29, as is shown in FIG. 6 from one end body 22 to another end body 22. The same applies for the fixing rods 27 which are neither depicted in FIG. 6.

The number of rows and lines of the module 29 in FIG. 6 is only given by way of example. The module preferably has at least 3, 4, 5, 6, 7, 8, 9, or 10 rows, however preferably not more than 5, 6, 7, 8, 9, 10, 12, or 15 ones.

In FIG. 6, furthermore rollers 28 are depicted (cf. FIG. 5), per module more than one row of metal bodies 13 being equipped with rollers 28. Preferably, not all rows are equipped with rollers.

FIG. 7 schematically shows how the complete conveyor belt 3 is assembled from several modules 29. In FIG. 7, by way of example three modules are arranged one next to the other, however, depending on the size of the modules 29, it can be more or less modules 29, such as 2, 4, 5, 6, 7, 8, 9, 10 or even more. The number of modules 29 in the conveying direction results from the required length of the conveyor belt 3.

The connection with the pin 23 and the keyhole openings 24, as they are shown in FIG. 4, serves for interconnecting the modules 29 laterally. The pins 23 can be located in FIG. 6, for example, at the left upper side and are connected to the keyhole openings 24 of an adjacent module.

In order to interconnect the modules 29 that are located one after the other in the conveying direction, these are assembled by means of connector rods 26 when they are assembled on site, as is schematically depicted in FIG. 5. These connector rods can have the length corresponding to the width of one module 29, or else can extend across the width of several modules or across the complete width of the conveyor belt 3.

With this construction, it is possible to prefabricate modules 29 that can be transported in layers in pallets or containers so as to save space. The module 29 in FIG. 6 can, for example, have dimensions of 1.1 m×0.7 m, so that is fits on a Europallet.

It is thus not necessary to mount and ship a complete conveyor belt 3. By the modular structure, a pre-assembly of identical modules 29 is rather possible, without the dimensioning of the conveyor belt already having to be known. Depending on the number of required modules 29, these are shipped as required and assembled at the site of erection of the pasteurizer 1 to form a conveyor belt 3.

The structure 39 formed of metal bodies, as is shown in FIG. 5, is not suited for transporting bottles or the like as the structure 39 does not form a conveyor surface.

In order to form a conveyor surface 38, plastic pieces 30, as they are shown in FIG. 8, are coupled to the structure 39 formed of the metal bodies 13, 22.

The plastic piece 30 shown in FIG. 8 has ribs 31 which are designed such that they extend into the conveying direction and are spaced so narrowly that their surface is suited for transporting bottles, i.e. that they form a conveyor surface. The distance between the ribs 31 can be, for example, between 0.1 and 1 cm, or 0.5 and 1.0 cm.

At the front end 36 of the plastic piece 30, projections 32 are arranged. A bulge 35 is provided behind these projections 32 at the bottom surface of the plastic piece 30, so that space for a roller 28 (see FIG. 5) is provided.

Furthermore, at its bottom surface, the plastic piece 30 has flaps 33 each having holes 34.

FIG. 9 shows how the plastic piece 30 is connected to a metal body 13 of FIG. 3.

The projections 32 of the plastic piece 30 are inserted in the recesses 17 of the U-shaped body 13, 22, and further a connector rod 27 is passed through the openings 20, this connector rod 27 then also passing through the holes 34 of the plastic piece 30. The connector rod 27 can be secured against shifting with respect to the bodies 13, 22 by appropriate means.

The plastic pieces 30 arranged in a line of a module 29 are thus held by the same connector rod 27 and thus form a group of plastic pieces 30 which can be uncoupled from the structure 39 independently of the other plastic pieces 30.

Due to the connector rods 27 and the projections 32, the plastic piece 30 is thus safely connected to the metal body 13. The recesses 17 and the projections 32, respectively, as well as the fixing rods 27 and the holes 34, however, have enough clearance for being able to absorb the different expansions of the different materials in case of changes in temperature, as they naturally occur in the pasteurizer.

The connection of plastic pieces 30 with the end bodies 22 is performed correspondingly.

FIG. 10 shows a section through the conveyor belt 3. The rollers 28 rest on a support 37. The connector rods 26, here formed as axles, extend through the rollers 28. The connector rods 26 thus support the metal bodies 13, 22, which remain spaced apart from the support 37 in the process. Simultaneously, the connector rods 26 connect metal bodies 13 and 22 situated one after the other and one next to the other.

Furthermore, FIG. 10 shows the plastic pieces 30. A plastic piece 30 has a rounded recess at its rear and at the bottom surface in which a front curvature of the subsequent plastic piece 30 can be accommodated. The plastic pieces 30 thus form a conveyor surface 38 situated above the structure 39.

The connector rods 27 for connecting the plastic pieces 30 with the bodies 13 are also shown in FIG. 10.

As the conveyor belt 3 rolls and does not trail on the support 37 by means of the rollers 28, clearly reduced frictional forces can be realised which clearly reduces the transport of the conveyor 3 and the tensile forces in the conveyor belt 3 connected therewith.

In FIG. 11, a plan view on the supports 37 is depicted. The supports 37 extend slightly diagonally with respect to the conveying direction 8, so that the rollers 28 (see FIG. 5 and FIG. 10) are in contact with the support 37 always at various positions when a support 37 is passed along. This prevents grooves or the like from forming in the rollers 28 due to wear.

As in the pasteurizer 1, water with various temperatures is dripping from above onto the goods to be pasteurizer, the conveyor belt 23 has to be sufficiently permeable to water.

Furthermore, it is an advantage if the fragments of, for example, glass bottles broken in the pasteurizer can pass downwards through the conveyor belt 3 in order to be thus collected. To this end, the conveyor surface of the conveyor belt 3 is not closed but has openings.

These openings are provided by the plastic pieces 30 by the spacing of the ribs 31. The endless structure 39 is anyway sufficiently wide-meshed.

The invention claimed is:

1. Pasteurizer with a conveyor belt for transporting the goods to be pasteurized, the conveyor belt comprising an endless structure formed by a plurality of metal bodies, wherein a plurality of plastic pieces forming the conveyor surface are coupled to the endless structure, wherein the metal bodies have a substantially U-shape with lateral legs extending in the conveying direction and a connecting part being arranged in the conveying direction at the front, wherein the lateral legs are provided with openings which serve for connecting several successive metal bodies by means of connector rods and wherein the plastic pieces are attached to the metal bodies by fixing rods, wherein the endless structure is composed of identical modules, wherein each module has several identical metal bodies in the direction of the conveying direction as well as in the direction transverse thereto and wherein the fixing rods have a length corresponding to the width of a module, seen in the conveying direction.

2. Pasteurizer according to claim 1, wherein a plurality of metal bodies are provided in the direction transverse to the conveying direction.

3. Pasteurizer according to claim 2, wherein the plurality of metal bodies comprises at least one of three, four, five, six, eight, ten, twelve, fifteen or twenty metal bodies.

4. Pasteurizer according to claim 2, wherein the metal bodies are substantially identical.

5. Pasteurizer according to claim 4, and wherein the metal bodies include end bodies, and the end bodies are not identical to the rest of the metal bodies.

6. Pasteurizer according to claim 1, wherein a plurality of plastic pieces are provided in the direction transverse to the conveying direction.

7. Pasteurizer according to claim 6, wherein the plastic pieces are substantially identical.

8. Pasteurizer according to claim 7, wherein the plurality of plastic pieces comprises one of three, four, five, six, eight, ten, twelve, fifteen or twenty plastic pieces.

9. Pasteurizer according to claim 1, wherein the plastic pieces are coupled to one of the endless structure individually or in a group of not more than fifteen plastic pieces so as to be releasable.

10. Pasteurizer according to claim 9, wherein the plastic pieces are coupled to one of the endless structure or in a group of not more than ten plastic pieces.

11. Pasteurizer according to claim 1, wherein exactly one plastic piece is provided per metal body.

12. Pasteurizer according to claim 1, wherein the plastic pieces comprise ribs at the conveyor surface that are oriented in the conveying direction.

13. Pasteurizer according to claim 1, wherein each module has, at the sides lateral in the conveying direction, at least one plug-in connection for connecting the module with another module.

14. Pasteurizer according to claim 13, wherein the plug-in connection is formed at several metal bodies of the module.

15. Pasteurizer according claim 1, wherein the metal bodies of one module are interconnected by the connector rods extending transversely to the conveying direction and which are passed through the openings of the metal bodies, so that they can be rotated with respect to one another.

16. Pasteurizer according to claim 15, wherein the connector rods have a length corresponding to the width of one module.

17. Pasteurizer according to claim 15, wherein the endless structure comprises rollers at the side opposite to the conveyor surface.

18. Pasteurizer according to claim 17, wherein the rollers can roll on supports, so that during the rolling of a roller along the support, the support and the roller are in contact at various points along the axle of the roller.

19. Pasteurizer according to claim 17, wherein the rollers are put on the connector rods.

20. Conveyor belt, in particular for a pasteurizer, comprising an endless structure formed by a plurality of metal bodies, wherein a plurality of plastic pieces forming the conveyor surface are coupled to the endless structure, wherein the metal bodies have a substantially U-shape, with lateral legs extending in the conveying direction, and a connecting part being arranged in the conveying direction at the front, wherein the lateral legs are provided with openings which serve for connecting several successive metal bodies by means of connector rods and wherein the plastic pieces are attached to the metal bodies by fixing rods, wherein the endless structure is composed of identical modules, wherein each module has several identical metal bodies in the direction of the conveying direction as well as in the direction transverse thereto and wherein the fixing rods have a length corresponding to the width of a module, seen in the conveying direction.

21. Conveyor belt, in particular for a pasteurizer, comprising a plurality of identical modules in the longitudinal as well as in the transverse direction, each module comprising several identical metal bodies in the longitudinal as well as in the transverse direction, wherein the metal bodies have a substantially U-shape, with lateral legs extending in the conveying direction, and a connecting part being arranged in the conveying direction at the front, wherein the lateral legs are provided with openings which serve for connecting several successive metal bodies by means of connector rods and wherein the plastic pieces are attached to a metal body by fixing rods, wherein the endless structure is composed of identical modules, wherein each module has several identical metal bodies in the direction of the conveying direction as well as in the direction transverse thereto and wherein the fixing rods have a length corresponding to the width of a module, seen in the conveying direction.

* * * * *